United States Patent
Marussich

(10) Patent No.: US 7,429,132 B1
(45) Date of Patent: Sep. 30, 2008

(54) HYDROSTATIC AIR BEARING WITH A POROUS METAL RING

(75) Inventor: Walter Marussich, Palm Beach Gardens, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 335 days.

(21) Appl. No.: 11/254,208

(22) Filed: Oct. 18, 2005

Related U.S. Application Data

(60) Provisional application No. 60/708,451, filed on Aug. 16, 2005.

(51) Int. Cl.
*F16C 32/06* (2006.01)
*F16C 33/28* (2006.01)
*F16C 17/18* (2006.01)

(52) U.S. Cl. ............ 384/114; 384/279; 384/901; 384/902

(58) Field of Classification Search ............ 384/99, 384/100, 114, 279, 276, 902, 901
See application file for complete search history.

(56) References Cited

U.S. PATENT DOCUMENTS

| | | | | |
|---|---|---|---|---|
| 2,610,096 A | * | 9/1952 | Mallory | 384/279 |
| 3,374,039 A | * | 3/1968 | Voorhies | 384/114 |
| 4,427,309 A | * | 1/1984 | Blake | 384/286 |
| 4,601,590 A | * | 7/1986 | Arii et al. | 384/99 |
| 4,715,731 A | * | 12/1987 | Tittizer | 384/100 |
| 4,744,676 A | * | 5/1988 | Lind | 384/115 |
| 4,838,710 A | | 6/1989 | Ohta et al. | |
| 5,695,424 A | | 12/1997 | Mizuta | |
| 6,513,980 B2 | | 2/2003 | Okamura et al. | |
| 6,533,460 B2 | | 3/2003 | Okamura et al. | |
| 6,872,002 B2 | | 3/2005 | Tomita et al. | |
| 6,901,845 B2 | | 6/2005 | Kiikka | |
| 2005/0051975 A1 | * | 3/2005 | Takayama et al. | 277/650 |

* cited by examiner

*Primary Examiner*—Thomas R Hannon
(74) *Attorney, Agent, or Firm*—John Ryznic

(57) ABSTRACT

A hydrostatic air bearing in which a journal rotates within a cavity formed within a bearing race, and a sleeve that rotates with the journal within the cavity of the bearing race, where the sleeve is formed of a porous metallic material that allows for a bearing fluid such as air to flow from a high pressure side of the journal to a low pressure side of the journal through the porous sleeve that acts to dampen the bearing fluid flow, and therefore dampen the bearing. Another embodiment is for a hydrodynamic air bearing with an annular sleeve arranged between the rotating journal and the bearing race, where the annular sleeve is formed of a porous metallic material to dampen air flow across the journal.

6 Claims, 3 Drawing Sheets

HYDROSTATIC AIR BEARING WITH A POROUS METAL RING

CROSS-REFERENCE TO RELATED APPLICATIONS

This application is related to and claims priority to U.S. Provisional Patent Application Ser. No. 60/708,451 filed on Aug. 16, 2005 and entitled HYDROSTATIC AIR BEARING WITH A POROUS METAL DISC.

BACKGROUND OF THE INVENTION

1. Field of the Invention

The present invention relates to a hydrostatic and a hydrostatic/hydrodynamic air bearing in which the bearing is damped by a porous metal sleeve encircling the journal.

2. Description of the Related Art Including Information Disclosed Under 37 CFR 1.97 and 1.98

A prior art hydrostatic air bearing is shown in FIGS. 1 and 2, while a prior art hydrostatic/hydrodynamic air bearing is shown in FIGS. 3 and 4. The prior art hydrostatic air bearing includes a solid sleeve 20 encircling the journal 12 and being rotated with the journal in the bearing both at a rotational velocity and direction of ω. A bearing fluid like air is pumped into the bearing assembly through passages 18 in the bearing race 14, the passages opening into a pressure dam 16 on the inner surface of a cavity 17 formed within the bearing race 14. The pressure of the bearing fluid is highest in the space having the shortest distance between the solid metal sleeve 20 and the bearing race 14. In FIG. 1, the highest pressure would be at the cutout portion located at the 6 o'clock position. The higher pressure bearing fluid flows from the higher pressure side to the lower pressure side, which in the case of the prior art FIG. 1 bearing is around the solid metal sleeve 20 toward the top cutout. In this prior art bearing, the bearing fluid is not restricted in the flow path from one side of the journal to the opposite side.

A prior art hydrostatic/hydrodynamic air bearing is shown in FIGS. 3 and 4 in which the solid metal sleeve 20 in FIGS. 1 and 2 is not secured on the journal, but is an annular sleeve that does not rotate with the journal 12 and includes a space 19 between the journal 12 and the metal sleeve 30. The bearing fluid flow is the same in FIGS. 3 and 4 and is FIGS. 1 and 2, in that the bearing fluid flows around the outer surface of the metal sleeve 30.

BRIEF SUMMARY OF THE INVENTION

The present invention is a hydrostatic air bearing having the structure of the prior art FIGS. 1 and 2 bearing described above, but replaces the solid metal sleeve 20 with a sleeve made of a porous metal (sometimes referred to as a foam metal) in which the porous metal allows for the bearing fluid to flow through the porous metal sleeve instead of only around the solid metal sleeve 20 of the prior art bearing. The bearing fluid passing through the porous metal sleeve is restricted in the flow and therefore acts as a damper for damping the bearing. FIG. 2 shows a side view of the air bearing in which a seal 25 is positioned between the space formed between the bearing race 14 and the solid metal sleeve 20. The space 17 is formed between the bearing race 14, the solid metal sleeve 20, and the seals 25.

In a second embodiment of the present invention, a hydrostatic/hydrodynamic air bearing takes the prior art bearing of FIGS. 3 and 4 and replaces the solid metal ring 30 with a porous metal ring. The porous metal ring allows for the bearing fluid to flow through the porous ring and dampen the bearing. Seals 25 are positioned between the bearing race 14 and the journal 12. The solid metal ring 30 is secured to the bearing race 14 by any well known locking means to prevent the ring 30 from rotating along with the journal 12. One known method is to connect a pin extending from the bearing race 14 in a direction parallel to the journal rotational axis and into the solid ring 30. The pin is flexible to allow for the solid ring to move with respect to the bearing race 14.

DETAILED DESCRIPTION OF THE INVENTION

Figure 1:
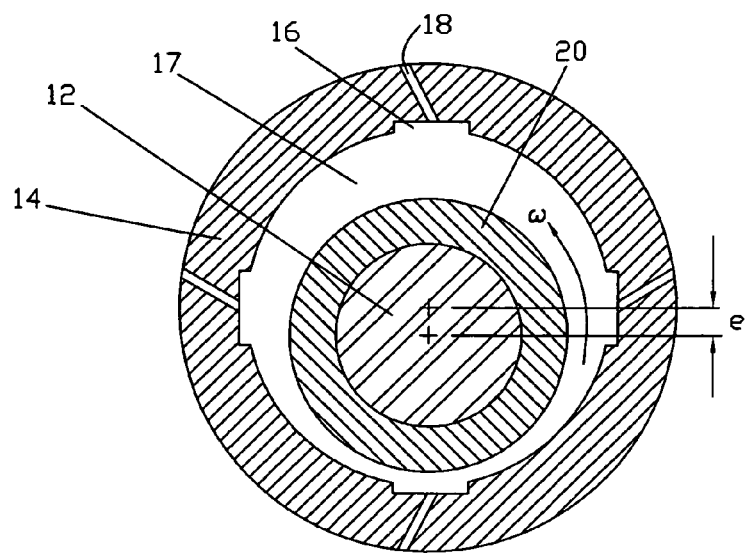
FIG. 1 shows a cross section of a front view of a Prior Art hydrostatic air bearing having a solid metal sleeve that rotates along with the journal.
Figure 2:
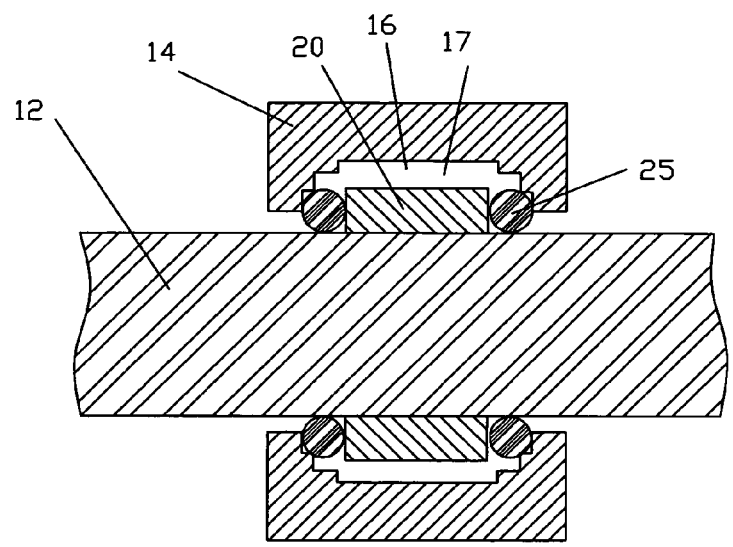
FIG. 2 shows a cross section of a side view of the Prior Art hydrostatic air bearing of FIG. 1.
Figure 5:
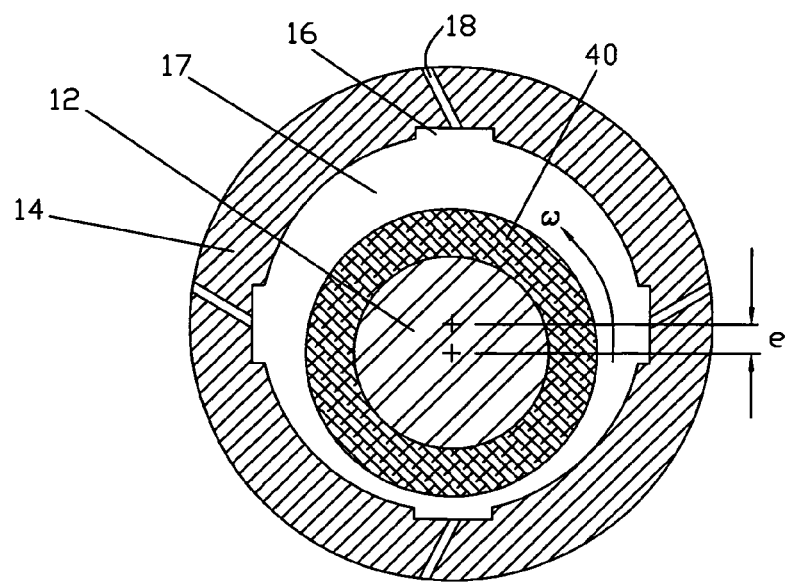
FIG. 5 shows a cross section of a front view of a first embodiment of the hydrostatic air bearing of the present invention.

A hydrostatic air bearing of the present invention is shown in FIG. 5. The bearing includes a bearing race 14 having an inner surface with a plurality of pressure dams 16 spaced apart, each pressure dam including a bearing fluid supply passage 18 opening into the pressure dam 16. A journal 12 is encircled by a porous metal sleeve 40 that has the same size and shape as the solid metal sleeve of the Prior Art air bearing, but is made of a porous metal material. A seal also is used in the present invention to seal the gap formed between the bearing race 14 and the porous sleeve 40 as is done in the FIG. 2 Prior Art air bearing. The porous metal sleeve 40 rotates along with the journal 12, and allows for the bearing fluid to flow through the sleeve 30. Because the porous metal sleeve 40 acts like a flow restriction, the bearing is damped. The porous metal dissipates energy as the bearing fluid flows through it. This provides the damping affect for the bearing.

The porous metal disk 40 provides for a hydrostatic bearing with a reduced stiffness by lowering the stiffness constant K. When the rotating journal 12 drifts to one side of the bearing race 14, such as the lower portion shown in FIG. 5, the pressure increases at this reduced spacing between the journal and the race (pressure spikes). The porous metal disk 40 will function to shear the air and reduce the pressure to prevent pressure spikes. The pressure in the reduced spacing portion will still be high enough to force the journal back to the centered position within the race. The elimination of the pressure spikes will provide for a gradual return of the journal to the centered position so that the bearing stiffness is reduced over that shown in the prior art hydrostatic bearings of FIGS. 1 through 4.

Figure 3:
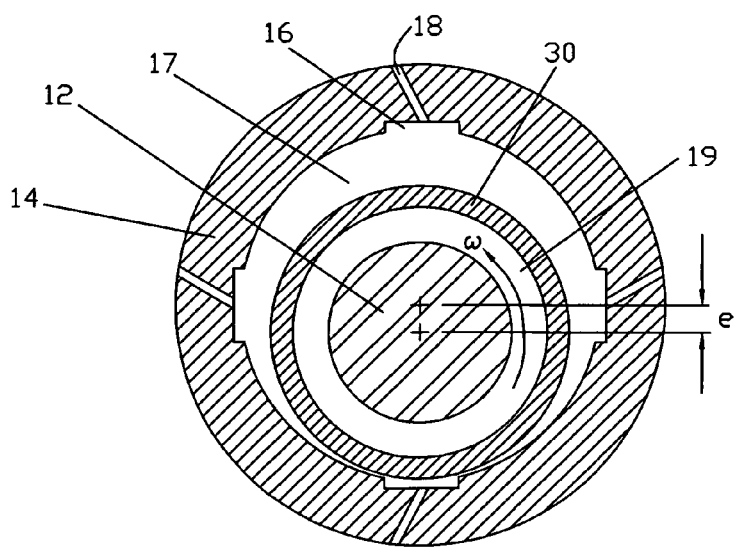
FIG. 3 shows a cross section of a front view of a Prior Art hydrostatic/hydrodynamic air bearing having a solid metal sleeve that rotates along with the journal.
Figure 4:
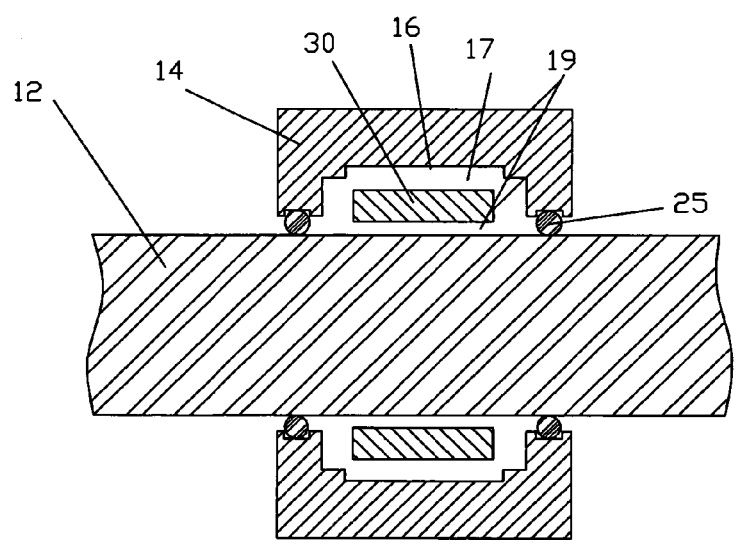
FIG. 4 shows a cross section of a side view of the Prior Art hydrostatic/hydrodynamic air bearing of FIG. 3.
Figure 6:
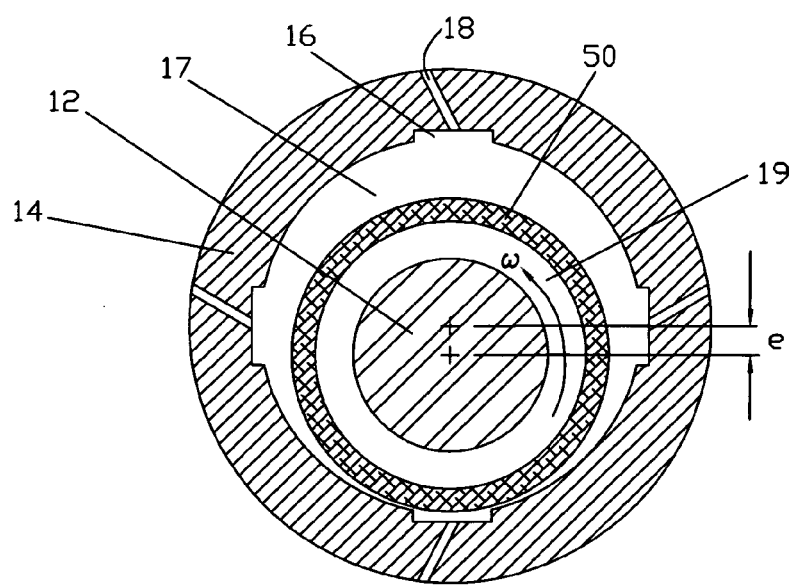
FIG. 6 shows a cross section of a front view of a second embodiment of the hydrostatic/hydrodynamic air bearing of the present invention.

FIG. 6 shows the present invention that adds the porous metal ring 50 to the Prior Art air bearing shown in FIGS. 3 and

4. The porous ring 50 has the same shape and size as the solid metal ring 30 used in the Prior Art, but is made from a porous metal material. A seal is used to seal the gap between the bearing race 14 and the porous metal ring 50 as shown in the Prior Art bearing of FIG. 4.

The porous metal sleeve and ring of the present invention can be formed from a porous metal material having various densities to customize the restriction produced as the bearing fluid flows through the porous member.

I claim:

1. A hydrostatic air bearing comprising:
   A bearing race with an annular inner surface;
   A pressure dam opening onto the inner surface of the bearing race;
   A fluid supply passage opening into the pressure dam to supply pressurized air to the hydrostatic bearing;
   A rotatable journal located within the annular inner surface;
   A porous material sleeve rotatably secured to the rotatable journal;
   A space formed between an outer surface of the porous metal sleeve and the annular inner surface; and,
   The porous material sleeve having a porosity to dampen the air pressure on a side of the rotatably journal having a reduced spacing due to shifting of the journal within the bearing.

2. The hydrostatic air bearing of claim 1, and further comprising:
   A plurality of pressure dams about equally spaced from each other and opening onto the inner surface of the bearing race; and,
   A fluid supply passage opening into the pressure dam for each of the pressure dams.

3. The hydrostatic air bearing of claim 1, and further comprising:
   The porous material of the sleeve being a porous metallic material.

4. A hydrodynamic air bearing comprising:
   A bearing race with an annular inner surface;
   A pressure dam opening onto the inner surface of the bearing race;
   A fluid supply passage opening into the pressure dam to supply pressurized air to the hydrostatic bearing;
   A rotatable journal located within the annular inner surface;
   A porous material annular sleeve encircling the rotatable journal such that the journal is free to rotate independent of the porous material annular ring;
   A space formed between an outer surface of the porous material annular sleeve and the annular inner surface; and,
   The porous material annular sleeve having a porosity to dampen the air pressure on a side of the rotatably journal having a reduced spacing due to shifting of the journal within the bearing.

5. The hydrodynamic air bearing of claim 4, and further comprising:
   A plurality of pressure dams about equally spaced from each other and opening onto the inner surface of the bearing race; and,
   A fluid supply passage opening into the pressure dam for each of the pressure dams.

6. The hydrodynamic air bearing of claim 4, and further comprising:
   The porous material of the annular sleeve being a porous metallic material.

* * * * *